United States Patent
Heller

[15] 3,644,211
[45] Feb. 22, 1972

[54] DISTYRYLBENZENE-DERIVATIVE SCINTILLATOR SOLUTIONS

[72] Inventor: Adam Heller, Berkeley, Calif.
[73] Assignee: New England Nuclear Corporation
[22] Filed: Oct. 30, 1967
[21] Appl. No.: 698,999

Related U.S. Application Data

[62] Division of Ser. No. 285,202, June 4, 1963, abandoned.

[30] Foreign Application Priority Data

June 27, 1962 Israel .................... 17,560

[52] U.S. Cl. .................... 252/301.2, 250/71.5
[51] Int. Cl. .................... C09k 1/02, G01t 1/20
[58] Field of Search .......... 252/301.2, 301.2 W; 260/240 B, 260/240 CA

[56] References Cited

UNITED STATES PATENTS

| | | | |
|---|---|---|---|
| 3,177,153 | 4/1965 | Pommer et al. | 252/301.2 W |
| 3,314,894 | 4/1967 | Nyilas et al. | 252/301.2 |

FOREIGN PATENTS OR APPLICATIONS

| | | | |
|---|---|---|---|
| 1,071,794 | 3/1954 | France | 252/301.2 |

OTHER PUBLICATIONS

Chemical Abstracts Vol. 47 Cols. 5807–8 1953 Abstract of Pichat et al.

Primary Examiner—Tobias E. Levow
Assistant Examiner—R. D. Edmonds
Attorney—Rines and Rines

[57] ABSTRACT

Scintillating solutions containing as solute at least one distyrylbenzene derivative compound from the group consisting of P,p'-bis-(3,4-methylene-dioxystyryl)-benzene, 2,2', 3,3'-tetramethoxy-distyrylbenzene, 4,4'-diisopropyl-distyrylbenzene, 2,2'-dimethoxy-distyrylbenzene, 2,2', 5,5'-tetramethyl-distyrylbenzene, 3,3', 4,4'-tetramethyl-distyrylbenzene, readily soluble in organic solvents such as dioxane, xylene and toluene.

3 Claims, No Drawings

3,644,211

DISTYRYLBENZENE-DERIVATIVE SCINTILLATOR SOLUTIONS

This is a division of application Ser. No. 285,202, filed June 4, 1963, now abandoned.

The present invention relates to scintillators, including scintillating solutions, their preparation and use; and, more particularly, to novel distyrylbenzene derivatives.

Scintillating solutions are widely used for the measurement of radioactive decay either by internal or external counting. For a scintillator to be suitable for use in such solutions, however, it has to possess a proper electronic structure and steric configuration, and at the same time to be adequately soluble in suitable organic solvents. Included in the organic solvents that are conventionally used for the preparation of scintillating solutions are, for example, benzene, alkylbenzenes, alkoxybenzenes, dioxane and phenylcyclohexane.

While the parent compound, p,p′-distyrylbenzene, as well as 4-monomethyl, 4-monomethoxy, 4,4′-dimethyl and 4,4′-dimethoxy derivatives are known, their solubility in the organic solvents conventionally used for the preparation of scintillating solutions is, however, disadvantageously less than 100 mg./l. at 20° C. so that these compounds are accordingly commercially unsuitable as scintillation solutes. It was therefore surprising to find that certain homologues of these compounds corresponding to the general formula hereinafter given possess both the necessary electronic structure and the required solubility for suitable commercial use as scintillation solutes.

Specifically, the present invention consists in new distyrylbenzene derivatives that are readily soluble in organic solvents conventionally serving for the preparation of scintillating solutions in an amount in excess of 100 mg./l. at 20° C., corresponding to the general formula

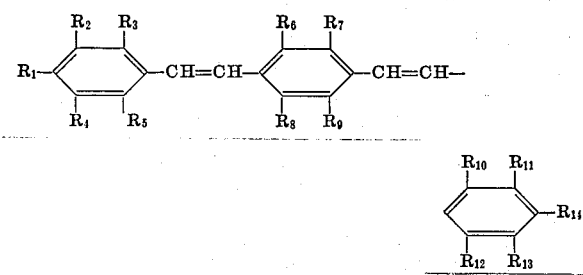

specific examples of which will be set forth hereinafter. It has been found that the novel compounds of the above general formula are excellent primary and secondary scintillation solutes for scintillating solutions.

The invention also consists in scintillating solutions containing as solute at least one compound as specified above. These solutions may be contained in suitable transparent containers and serve as comparatively cheap commercial substitutes for scintillating monocrystals. In these solutions both the primary and secondary scintillation solutes may be selected from the novel compounds of this invention. Alternatively, only the primary or the secondary scintillator may be a compound of this invention while the complementary scintillator may be a conventional one.

The invention further provides a method for the measurement of the decay of a radioactive substrate comprising preparing a scintillating solution containing as primary and/or secondary scintillator a compound as specified above, bringing this solution into sufficient proximity with the radioactive substances for the solution to scintillate and counting the scintillations in a manner known per se.

The scintillating solutions of this invention are applicable both for external and internal counting. They have the great advantage of being practically transparent to their own fluorescence and accordingly suitable for the production of so-called "giant" or large volume scintillators. Such giant or large volume scintillators are used both for external and internal counting, and since they do not reabsorb their own radiation, even photons emitted at large distances from the photosensitive surface of the counter have a high probability of being counted.

The novel compounds of this invention can be prepared in various ways. According to one method, a suitably substituted benzyl chloride is reacted with triphenylphosphine and the resulting benzyl triphenylphosphonium salt is condensed with terephthalaldehyde.

By another method, 1,4-bis-chloromethyl benzene is reacted with 2 moles of triphenylphosphine and the resulting p-xylylene-bis-(triphenylphosphonium chloride) is reacted with a suitably substituted benzaldehyde.

By yet another method, a suitably substituted benzyl chloride is converted by a Grignard-type reaction into the corresponding magnesium chloride which latter is condensed with terephthalaldehyde. Upon hydrolysis and dehydration, the desired distyrylbenzene derivative is obtained.

By a further method, 2 moles of phenylacetyl chloride (in which the phenyl nucleus may be substituted) are condensed with benzene, or a substituted benzene, in the presence of a Friedel-Crafts-type catalyst. The resulting dicarbonyl compound is reduced to the corresponding dihydroxy compound and the latter submitted to a treatment by which 2 moles of water are split off yielding the desired distyrylbenzene derivative.

In addition to their use as scintillators, the novel compounds of the present invention may also be used as color brighteners and as ultraviolet absorbers. They may thus be admixed in small quantities to liquid or solid materials in order to neutralize any color modifications and/or to prevent deterioration as the result of the absorption of ultraviolet radiation or ionizing radiation.

The invention is illustrated by the following examples to which it is not limited, all melting points being corrected.

EXAMPLE 1 p-Xylylene-bis-triphenylphosphonium chloride was prepared according to T. W. Campbell and N. R. McDonald Organic Syntheses, 40, 85 (1960).

17.3 g. (0.025 moles) of p-xylylene-bis-(triphenylphosphonium chloride) and 9.8 g. of piperonal (0.065 moles) were dissolved in 100 ml. of hot absolute ethyl alcohol. To the solution, 250 ml. of 0.2 M lithium ethoxide in ethanol was added and the solution was allowed to stand overnight. Thereafter, 100 ml. of water was added and the solution stirred until crystallization was complete. The crystallized p,p′-bis-(3,4-methylene-dioxystyryl)-benzene was dried in vacuo and then isomerized by reflux during 2 hours in a xylene solution containing a trace of iodine. In this manner, the trans-trans isomer was obtained which was recrystallized from chlorobenzene and dioxane. The yield was 8.5 g., corresponding to 92 percent of the theory. M.P. 264° C. The compound crystallized in the form of yellow crystals and was further characterized as follows:

| Analysis: | Calculated | C 77.82% ; H 4.90% |
| --- | --- | --- |
| | Found | C 77.82% ; H 5.20% |
| Spectrum of fluorescence: | | λmax 414 mμ. |
| | | λmax 434 mμ. |
| | | λmax 456 mμ. |
| Spectrum of absorption: | | λmax 383 mμ.; ε=72,500 |
| | | λmax 257 mμ.; ε=17,000 |
| Solubility: | | 0.88 g./l. at 28° C. in dioxane |
| | | 0.07 g./l. at 25° C. in xylene |
| Scintillation efficiency: | | High efficiency as secondary scintillator for 2,5-diphenyloxazole in dioxane, or 2,5-diphenyl-oxazole + naphthalene in dioxane |

EXAMPLE 2

By proceeding in an analogous manner as described in Example 1, 2,2′, 3,3′-tetramethoxy-distyrylbenzene was prepared from 17.3 g. (0.025 moles) of p-xylylene-bis-(triphenylphosphonium chloride) and 10.7 g. (0.065 moles) of trans-trans 2,3-dimethoxybenzaldehyde. The product was crystallized from methyl ethyl ketone, dioxane and trichloroethylene, the boiling solutions being treated with activated charcoal. The yield was 8.5 g., corresponding to 84 percent of the theory. M.P. 175° C. The crystals are colorless with a violet florescence.

Further characteristics:

| Analysis: | Calculated | C 77.59%; H 6.51% | |
| | Found | C 77.49%; H 6.72% | |
| Spectrum of fluorescence: | | λmax 400 mµ. | |
| | | λmax 430 mµ. | |
| | | λmax 441 mµ. | |
| Spectrum of absorption: | | λmax 360 mµ. | ε=59,000 |
| | | λmax 255 mµ. | ε=18,000 |
| Solubility: | | 10 g./l. at 25° C. in dioxane | |
| | | 2 g./l. at 25° C. in xylene | |

Scintillation efficiency:

1. As primary scintillator:
   46 percent on the anthracene scale in a dioxane solution containing 10 g./l. of the compound and 100 g./l. naphthalene. 20.2 percent on the same scale in a 10 g./l. dioxane solution. 62 percent in a 2 g./l. solution in xylene.
2. As secondary scintillator:
   78 percent on the anthracene scale in xylene solution containing 4 g./l. of p-terphenyl and 0.15–0.20 g./l. of the compound.

This compound is the most soluble in dioxane of all the compounds of this group and is the most efficient primary scintillation solute in dioxane solution. Owing to this property and the fact that dioxane is water miscible, the compound of this example can find wide applications for internal-counting scintillation measurements of radioactive materials obtained in the form of aqueous solutions, and for the determination of the tritium content of water.

EXAMPLE 3

In an analogous manner as described in Example 1, trans-trans 4,4'-diisopropyl-distyrylbenzene was prepared from 17.3 g. (0.025 moles) of p-xylene-bis-(triphenylphosphonium chloride) and 9.6 g. (0.06 moles) of cumaldehyde. The product was recrystallized twice from xylene and purified once by treatment of the boiling xylene solution with active charcoal. The yield was 3.5 g., corresponding to 40 percent of the theory. M.P. 238° C. The compound crystallizes in the form of yellow leaflets.

Further characteristics:

| Analysis: | Calculated | C 91.80%; H 8.20% | |
| | Found | C 91.82%; H 8.28% | |
| Spectrum of fluorescence: | | λmax 4,000 A | |
| | | λmax 4,200 A | |
| | | λmax 4,450 A | |
| Spectrum of absorption: | | λmax 3,620 A | ε=74,000 |
| | | λmax 2,470 A | ε=21,000 |
| Solubility: | | 2.4 g./l. at 20° C. in xylene | |

Scintillation efficiency:

1. As primary scintillator:
   65–70 percent on the anthracene scale in a saturated xylene solution at 24° C.
2. As secondary scintillator;
   79–81 percent on the anthracene scale in a xylene solution containing 200 mg./l. of the compound and 4 g./l. p-terphenyl.

This appears to be one of, if not the highest scintillation efficiency measured for a scintillating solution.

EXAMPLE 4

By producing in an analogous manner as described in Example 1, trans-trans 2,2'-dimethyoxy-distyrylbenzene was prepared from 17.3 g. (0.025 moles) of p-xylene-bis-(triphenylphosphonium chloride) and 10 g. (0.065 moles) of 0-methoxy-benzaldehyde. The product was first crystallized from 1,1,2-trichloroethane, the boiling solution being treated with active charcoal, and then from toluene. The yield was 5.0 g. corresponding to 60 percent of the theory. M.P. 207° C.

Further characteristics:

| Analysis: | Calculated | C 84.19%; H 6.48% | |
| | Found | C 84.53%; H 6.45% | |
| Spectrum of fluorescence: | | λmax 410 mµ. | |
| | | λmax 430 mµ. | |
| Spectrum of absorption: | | λmax 366 mµ. | ε=57,500 |
| | | λmax 246 mµ. | ε=29,000 |
| Solubility: | | 1.7 g./l. at 25° C. dioxane | |
| | | 1.4 g./l. at 25° C. in xylene. | |

EXAMPLE 5

55 g. (0.354 moles) of 2,5-dimethylbenzylchloride and 80 g. (0.305 moles) of triphenylphosphine in 500 ml. of xylene were refluxed for 7 hours. The colorless phosphonium salt which precipitated was collected and dried in vacuo. The crystals weighed 110 g., corresponding to 88 percent of the theory. M.P. 289° C.

8.32 g. (0.02 moles) of the phosphoniumsalt and 1.34 g. (0.01 mole) of terephthalaldehyde were suspended in 50 ml. of absolute ethyl alcohol. 100 ml. of a 0.2 M solution of lithium ethoxide in ethanol were added. The mixture was stirred overnight and 70 ml. of water added. The crystals which precipitated were collected, washed with 70 percent ethyl alcohol, dried, boiled with methylcyclohexane containing a trace of iodine for 1 hour. The trans-trans 2,2', 5,5'-tetramethyl-distyrylbenzene which precipitated on cooling weighed 2.7 g. (80 percent yield) and melted after two recrystallizations from methylcyclohexane at 181° C.

Further characteristics:

| Analysis: | Calculated | C 92.30%; H 7.70% | |
| | Found | C 92.10%; H 7.50% | |
| Spectrum of fluorescence: | | λmax. 405 mµ | |
| | | λmax. 427 mµ | |
| | | λmax. 456 mµ | |
| Spectrum of absorption: | | λmax. 358 mµ | ε=53,000 |
| | | λmax. 246 mµ | ε=23,000 |
| Solubility: | | 3.3 g./l. at 26° C. in xylene. | |

Scintillation efficiency:

1. As primary scintillator:
   61 percent on the anthracene scale at a concentration of 2.5 g./l. in xylene.
2. As secondary scintillator:
   80 percent on the anthracene scale in xylene solution containing 180 mg./l. of the compound and 4 g./l. p-terphenyl.

EXAMPLE 6

A mixture of 13.1 g. (0.05 mole) of triphenylphosphine and 9.2 g. (0.06 mole) of 4-chloromethyl-1,2-dimethylbenzene and 150 ml. of xylene was refluxed during 18 hours. The white phosphonium salt was collected and dried in vacuo. The yield was 22 g., corresponding to 99 percent of the theory. M.P. 223°–225° C.

16.6 g. (0.04 mole) of the phosphoniumsalt thus obtained and 2.68 g. (0.02 mole) of terephthalaldehyde were dissolved in 60 ml. of ethyl alcohol. 210 ml. of 0.2 M solution of lithium ethoxide in ethanol were added and precipitation started immediately. After 30 minutes, 50 ml. of water were added, the precipitate collected, dried, boiled with 70 ml. of xylene containing 0.15 g. of iodine for 1 hour, filtered and recrystallized from boiling xylene and from benzene. The trans-trans 3,3', 4,4'-tetramethyl-distyrylbenzene obtained was in the form of yellow plates weighing 1.5 g., corresponding to 25 percent of the theory. M.P. 239°–240° C.

Further characteristics:

| Analysis: | Calculated | C 92.30%; H 7.70% | |
| | Found | C 92.24%; H 7.79% | |
| Spectrum of fluorescence: | | λmax 401 mµ | |
| | | λmax 431 mµ | |
| | | λmax 445 mµ | |
| Spectrum of absorption: | | λmax 363 mµ | ε=57,000 |

| | | |
|---|---|---|
| Solubility: | λmax 252 mμ. ε=16,000 | |
| | λmax 246 mμ. ε=18,600 | |
| | λmax 236 mμ. ε=22,500 | |
| | 0.25 g./l. in xylene at 24° C. | |
| Scintillation properties: | Approaching those of 1,4-bis-(2-(5-phenyl)-oxazolyl)-benzene under similar conditions. | |

EXAMPLE 7

To 3.2 g. (0.13 moles) of magnesium turnings in 50 ml. of ether a solution of 21.6 g. (0.128 moles) of p-chloromethyl-cumene in 250 ml. of ether was run in during 45 minutes. The mixture was refluxed for 30 minutes, after which a solution of 0.64 g. (0.048 moles) of p-terephthalaldehyde in 250 ml. benzene was added during 2 hours. The mixture was refluxed during 4 hours and allowed to stand overnight. The mixture was decomposed by pouring into a mixture of ice and hydrochloric acid. The organic phase was separated and the aqueous phase was extracted twice with 100 ml. ether. The combined organic solutions were dried over potassium carbonate, and the ether distilled off. The remaining diol which solidified on cooling was dehydrated by boiling with a solution of 250 mg. iodine in 200 ml. xylene. On cooling, 2.1 g. of trans-trans 4,4'-diisopropyl-distyrylbenzene precipitated, corresponding to 8.4 percent of the theory. The compound after two recrystallizations from xylene melted at 238° C. and weighed 1.8 g. and was identical with the one obtained according to Example 3.

The liquid scintillation solutes according to the invention, used as secondary scintillators, yield together with p-terphenyl in xylene solutions which have efficiencies between 76 to 84 percent on the anthracene scale and are transparent to their own fluorescent radiation. By comparison, the scintillation efficiency of a xylene solution of p-terphenyl and 1,4-bis-(2-(5-phenyl)-oxazolyl)-benzene, which is the best scintillation system reported, is 76.5 percent on the same scale.

While it takes 14 minutes to dissolve 100 mg. of 0.2 mm. crystals of the parent distyrylbenzene in 1 liter of xylene, the time required to dissolve 100 mg. of similar size crystals of the 4,4'-diisopropyl derivative, under similar conditions, is only 3.6 minutes. This indicates that the ratio of the times necessary to reach complete solution of crystals of the same diameter is about 1:4 in the favor of the substituted compound.

Due to the limited solubility of the parent compound, moreover, it is not useful as a primary solute, either in dioxane or in xylene, as further distinguished from the present invention.

The color brightening properties of the new compounds of the present invention are demonstrated by the following experiment: To an impure sample of oleic acid which has a yellowish tint, a few drops of a benzene solution of 2,2'-dimethoxy-distyrylbenzene are added. The yellowish color disappears and the solution looks colorless.

What is claimed is:

1. Scintillating solutions consisting essentially of significant amounts of at least one compound which is a distyrylbenzene derivative as solute, said compound being selected from the group consisting of p,p'-bis (3,4-methylene-dioxystyryl)-benzene, 2,2', 3,3'-tetramethoxy-distyrylbenzene, 4,4'-diisopropyl-distyrylbenzene, 2,2'-dimethoxy-distyrylbenzene, 2,2', 5,5'-tetramethyl-distyrylbenzene, 3,3', 4,4'-tetramethyl-distyrylbenzene, and an organic solvent selected from the group consisting of dioxane, xylene and toluene, the proportion of said derivative with respect to said solvent being at least substantially 100 mg./l. at 20° C. and the amount of said derivative being sufficient to produce substantial measurable scintillations for the solution.

2. Scintillating solutions according to claim 1, containing a primary and secondary scintillation solute, both such solutes being compounds which are different distyrylbenzene derivatives defined in claim 1.

3. Scintillating solutions according to claim 1, containing a primary and a secondary scintillation solute, either of which is a compound defined in claim 1, while the other is a conventional scintillation solute.

* * * * *